US007647554B2

(12) United States Patent
Pickover et al.

(10) Patent No.: US 7,647,554 B2
(45) Date of Patent: Jan. 12, 2010

(54) SYSTEM AND METHOD FOR IMPROVED SPELL CHECKING

(75) Inventors: Clifford Alan Pickover, Yorktown Heights, NY (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 659 days.

(21) Appl. No.: 11/446,354

(22) Filed: Jun. 2, 2006

(65) Prior Publication Data

US 2006/0224586 A1   Oct. 5, 2006

Related U.S. Application Data

(62) Division of application No. 09/612,006, filed on Jul. 7, 2000, now abandoned.

(51) Int. Cl.
G06F 17/00 (2006.01)
(52) U.S. Cl. .......................................... 715/257; 707/1
(58) Field of Classification Search .................. 707/100, 707/1; 715/257, 259, 260
See application file for complete search history.

(56) References Cited

U.S. PATENT DOCUMENTS

| | | | | |
|---|---|---|---|---|
| 4,847,766 A | | 7/1989 | McRae et al. ................ | 715/532 |
| 5,715,469 A | * | 2/1998 | Arning ......................... | 715/210 |
| 5,787,451 A | | 7/1998 | Mogilevsky ................. | 715/257 |
| 5,812,863 A | | 9/1998 | Ishikawa ..................... | 715/533 |
| 5,875,443 A | | 2/1999 | Nielsen .......................... | 707/2 |
| 5,991,742 A | | 11/1999 | Tran ............................ | 705/32 |
| 6,018,735 A | | 1/2000 | Hunter .......................... | 707/5 |
| 6,047,300 A | * | 4/2000 | Walfish et al. ............... | 715/257 |
| 6,131,102 A | | 10/2000 | Potter .......................... | 715/533 |
| 6,424,983 B1 | | 7/2002 | Schabes et al. ............. | 715/533 |
| 6,578,032 B1 | | 6/2003 | Chandrasekar et al. ......... | 707/6 |
| 6,918,086 B2 | * | 7/2005 | Rogson ....................... | 715/257 |

(Continued)

FOREIGN PATENT DOCUMENTS

DE          4323241          5/2001

*Primary Examiner*—Cheryl Lewis
(74) *Attorney, Agent, or Firm*—Ohlandt, Greeley, Ruggiero & Perle, L.L.P.; Daniel P. Morris, Esq.

(57) ABSTRACT

A spell checking method presents a selectable list of similarly spelled words, when a misspelled word is selected by the user who wishes to find the correct spelling. One feature determines the "content" or "topic" of a document. Based on the content, the spell checker presents likely replacement words for a misspelled word. In another feature, for each letter in the word, the spell checker checks for "nearby" letters on keyboard keys to improve the spell checker's list of replacement words. The system also monitors a user's history of use with respect to nearby or key (i.e. letter) substitutions and considers this information when presenting lists of alternative words. Another feature corrects spelling by monitoring a user's history of spell check corrections. Aggregate tables of corrections for more than one user may be maintained, shared, and provided by spell checkers. Various priorities may be used so that one approach is given favor over another. The priorities may be determined by manual input of a user or automatically provided by the system software. Another feature provides an auxiliary window that shows a user's most-frequently or most-recently misspelled words. The user can use a clipboard facility to copy and paste words of interest from the auxiliary window to a current document.

20 Claims, 5 Drawing Sheets

U.S. PATENT DOCUMENTS

2002/0010639 A1 1/2002 Howey et al. .................. 705/26
2002/0010726 A1 1/2002 Rogson ...................... 707/533
2002/0103834 A1 8/2002 Thompson et al. .......... 707/526
2002/0177999 A1 11/2002 Ortega ........................ 704/231

* cited by examiner

SYSTEM AND METHOD FOR IMPROVED SPELL CHECKING

CROSS-REFERENCE TO RELATED APPLICATION

The present application is a divisional of pending U.S. patent application Ser. No. 09/612,006, filed on Jul. 7, 2000 now abandoned.

FIELD OF THE INVENTION

This invention relates to word processing, and more specifically relates a method and system for correcting the spelling of words in a word processing system.

BACKGROUND

A primary use of computers, especially personal computers, is "word processing." Word processors have replaced the typewriter as a principal means for document production. When producing documents, it is typically very important that each word is spelled correctly. In word processors, a spell checking program (spell checker) is often used to check the spelling of words in a document. The user typically invokes a spell checker by selecting a spelling tool option. A spell checker has an associated dictionary file that contains a list of correctly spelled words. To check the spelling of a word in the document, the spell checker searches the dictionary for that word. If the word is in the dictionary, then the word is correctly spelled. Otherwise, the word is misspelled. The spell checker typically reports misspelled words to the user and prompts for the correct spelling. For every potentially misspelled word, the spelling tool may prompt the user to replace, ignore, or edit the word. This prompting often involves the presentation of a selectable list of similarly spelled words that the user may select from. When the user selects the desired word, the spell checker then replaces the misspelled words with the correctly spelled word.

Spell checking is also provided at various Internet web pages, such as the popular Alta Vista web site at www.altavista.com that provides alternate spellings to words that are misspelled when users enter words in order to searching for information on the web. A system and method for an improved spell checker is, therefore, useful for word processing in any arena in which text is typed, such as in computers or in web search engines. The use of an improved spell checker is not restricted to documents that are generated by typing at a keyboard, but also applies to text generated by voice input or handwriting input.

Spell checking according to the current process is inefficient because the selectable list of similarly spelled words may not actually contain the word the user was attempting to spell. If the list does contain the word, it is often cumbersome to locate the correct word in a list containing many alternative spellings. Thus, while current spell checking is a helpful feature, it is not efficient in terms of required user interaction.

Examples of spell checkers that use databases of similarly spelled words are discussed in U.S. Pat. No. 5,875,443 issued to Nielsen on Feb. 23, 1999. This patent discusses the use of remote databases available on the Internet and is herein incorporated by reference in its entirety. Examples of "background" spell checking are discussed in U.S. Pat. No. 5,787,451 issued to Mogilevsky on Jul. 28, 1998, which is herein incorporated by reference in its entirety. "Background" spell checking refers to spell checking performed during idle periods of the word processor. The spell checker performs "background" spell checking so that spelling errors can be conveniently highlighted through the document during an editing session.

SUMMARY OF THE INVENTION

To address the problems and drawbacks of existing spell checkers, this invention provides a method for presenting a selectable list of similarly spelled words, when a misspelled word is selected by the user who wishes to find the correct spelling. In one embodiment, the improved spell checker determines the "content" or "topic" of a document. Based on the content, the spell checker presents likely replacement words for a misspelled word. In an alternate embodiment, for each letter in the word, the spell checker checks for "nearby" letters on keyboard keys to improve the spell checker's list of replacement words. The system also monitors a user's history of use with respect to nearby or key (i.e. letter) substitutions and considers this information when presenting lists of alternative words. A user may supply this information manually. The improved spell checker also corrects spelling by monitoring a user's history of spell check corrections. Aggregate tables of corrections for more than one user may be maintained, shared, and provided by spell checkers. The aforementioned methods of improving spell checking may be used alone or performed sequentially as a sequence of checks, with various weights given to the priority of the different methods. Various priorities may be used so that one approach is given favor over another. The priorities may be determined by manual input of a user or automatically provided by the system software.

An improved spell checker may also provide an auxiliary window that shows a user's most-frequently or most-recently misspelled words. The user can use a mouse to copy and paste words of interest from the auxiliary window to a current document using the "clipboard" provided with many operating systems. Seeing the correct words on the screen may also have educative value, reinforcing in the user's mind the correct spelling for each word.

Note that although examples have been given with respect to keyboard input, the methods presented here may apply to systems with speech input and handwriting recognition. Therefore, the system and method can also be used to improve handwriting and speech recognition.

BRIEF DESCRIPTION OF THE DRAWINGS

The invention will be further understood by reference to the following detailed description when read in conjunction with the accompanying drawings, wherein.

DETAILED DESCRIPTION

Figure 1:
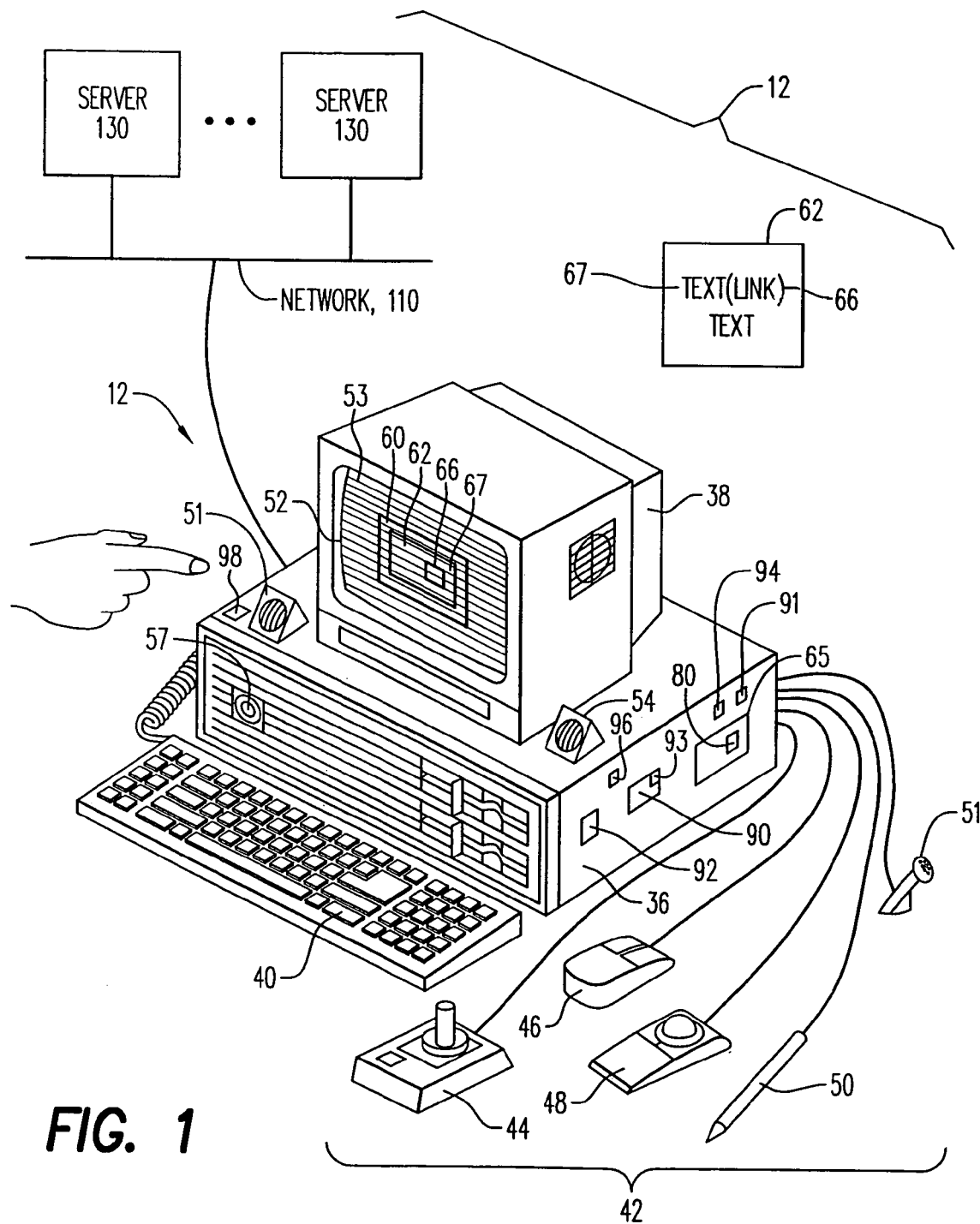
FIG. 1 depicts a pictorial representation of an example computer system that embodies the present invention.

With reference now to the figures, and in particular to FIG. 1, there is illustrated a computer system 12 in accordance with the method and system of the present invention. Computer system 12 includes a computer 36, a computer display 38, a keyboard 40, and multiple input pointing devices 42. Those skilled in the art will appreciate that input pointing devices 42 may be implemented utilizing a pointing stick 44, a mouse 46, a track ball 48, a pen 50, display screen 52 (e.g. a touch display screen 52), or any other device that permits a user to manipulate objects, icons, and other display items in a graphical manner on the computer display 38. Connected to computer system 12 may also be audio speakers 54 and/or audio input devices 51 (See for example, IBM's VoiceType Dictation system. "VoiceType" is a trademark of the IBM Corporation.).

A graphical user interface 53 may be displayed on screen 52 and manipulated using any input pointing device 42. Graphical user interface 53 may include display of a word processing application 60 that displays texts in a document 62 using any known word processing program 90 with a spell checker function 93 that checks the spelling of words in a document. The document may include graphical, audio, or text information 67 presented to the user via the display screen 52, speakers 54, or other output devices. The information pages may contain selectable links 66, such as hypertext links used on the World Wide Web, to other information pages 62, where such links can be activated by one of the input devices 42 to request the associated information pages. This hardware is well known in the art and is also used in conjunction with televisions ("web TV") and multimedia entertainment centers. Computer system 12 contains one or more memories 65 on which the invention reserves space of a cache 80. A server 130 that is connected to computer system 12 through a network 1 10 can send pages of multimedia information to cache 80. Network 110 can be any known local area network (LAN) or wide area network (WAN), e.g., the Internet.

Figure 1A:
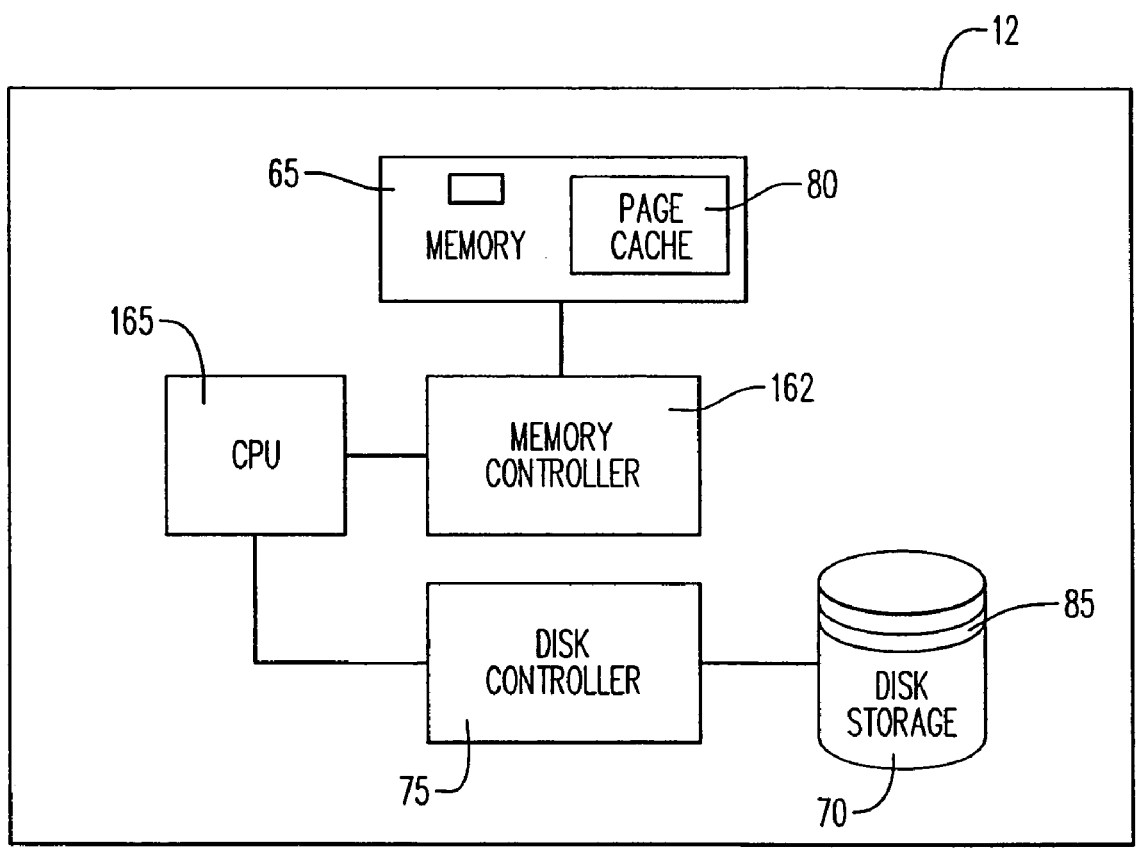

With reference now to FIG. 1A, there is illustrated a block diagram of the architecture of computer system 12 in accordance With the present invention. The core architecture includes a Central Processing Unit 165, memory controller 162, system memory 65, disk storage 70, and disk storage controller 75. A portion of system memory 65 is set aside for information page cache 80. Additionally, a file space 85 on disk storage unit 70 may be set aside as an additional document page cache. Generally speaking, a cache is a place where data (files, images, and other information) can be stored to avoid having to read the data from a slower device, such as a remote, network-attached computer disk. For instance, a disk cache can store information that can be read without accessing remote disk storage.

Figure 2:
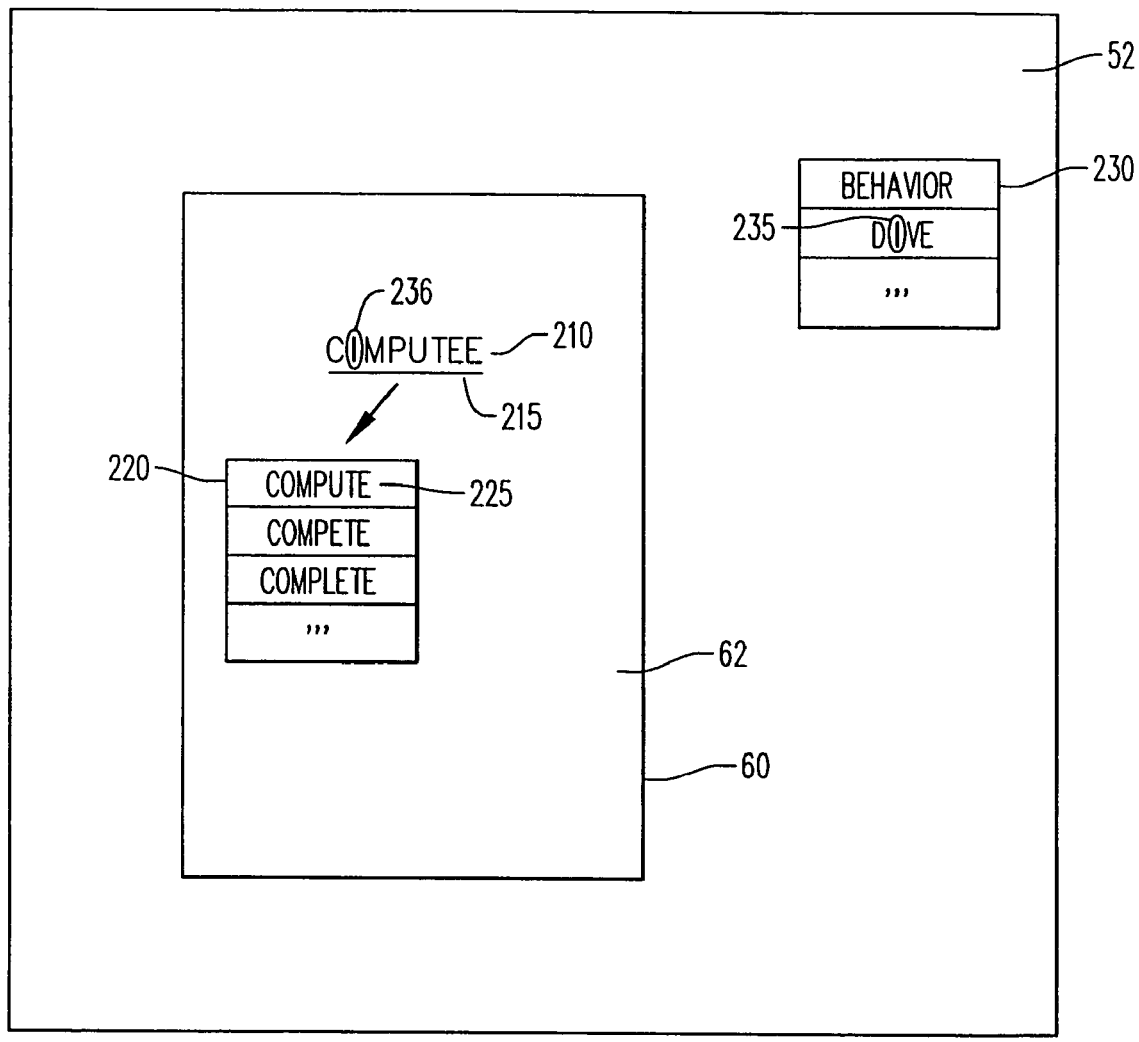
FIG. 2 depicts a pictorial representation of a window of a word-processing program equipped with a spell checker.

With reference now to FIG. 2, a display screen 52 is shown with a display of a word processing application 60. Misspelled words such as misspelled word "cimputee" 210 are often highlighted 215, or otherwise called to the user's attention, by spell checker 93 of a word processing program 90 (see FIG. 1). When the user selects the word 210, a list 220 of alternate similar spellings is presented to the user from which the user may select the correct spelling of the word intended to be in the document. For example, the first correctly spelled alternate word 225 is "compute."

Figure 3:
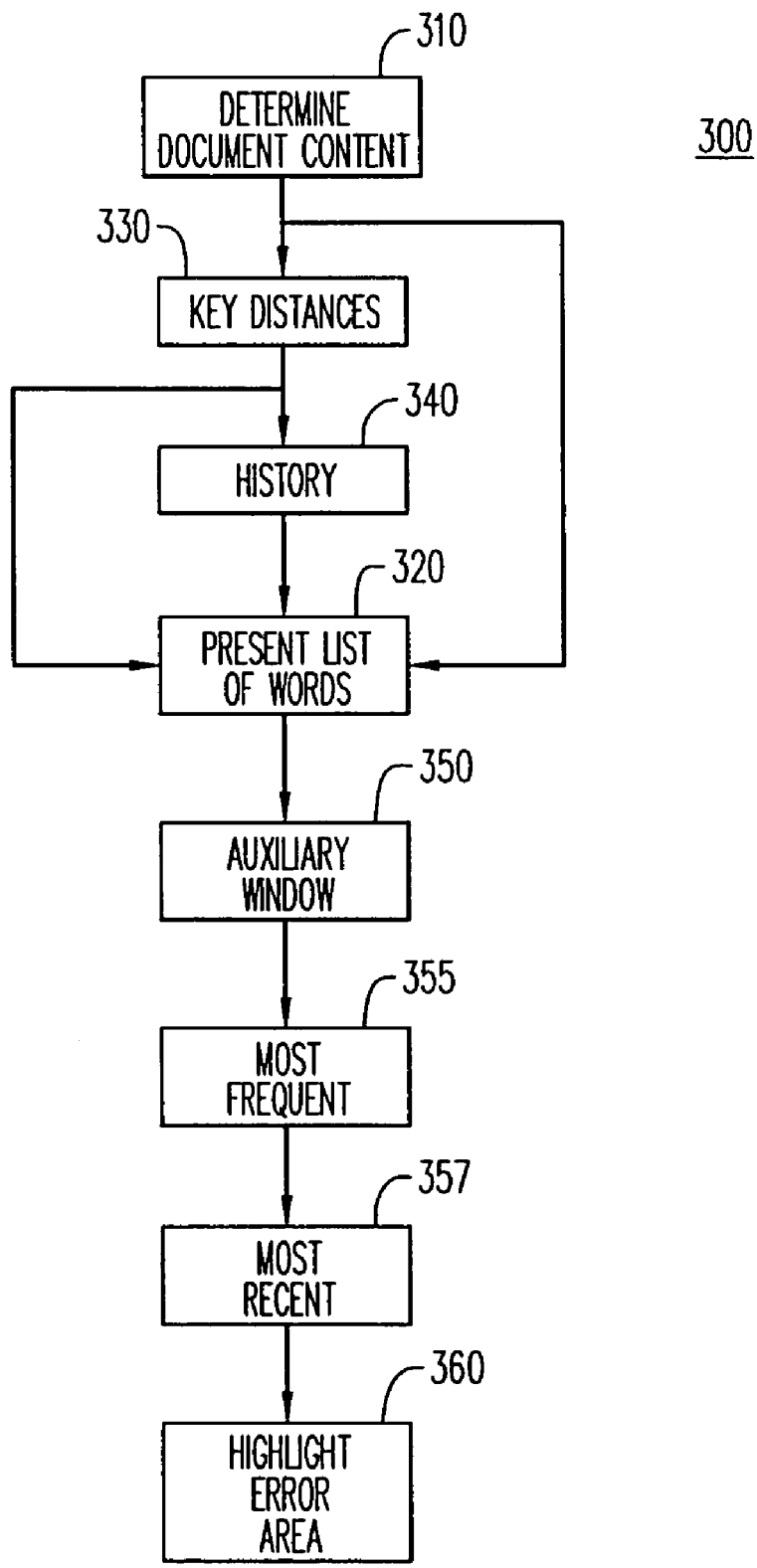
FIG. 3 is a flow chart depicting the steps performed by the improved spell checker in the computer system shown in FIG. 1.

FIG. 3 comprises a flow chart for one preferred spell checking process 300 implemented by the word processing program 90 and spell checker 93. In step 310, spell checker 93 determines the "content" or "topic" of a document. This may be accomplished by scanning the words in the document's title, major headings, and text and counting the number of times each word is used. For example, spell checker 93 may determine that the word, "divination", is in the document's title. The word may also appear twenty times in the document. This indicates that "divination" is likely an important word that relates to the document's "content". If a user sometimes misspells "divination" as "duvonaton" spell checker 93 should first present (in list 220 of FIG. 2) the word "divination" as a possible correctly spelled word 225 before presenting other possible choices for words, like "deviation".

Additionally, in step 310, if the spell checker 93 determines that "divination" is the content of the document, and is important to the document, spell checker 93 will use latent semantic indexing, synonym lists and thesauruses 92 (shown in FIG. 1), and/or related methods to determine that probably related words, such as "fortune-telling", may likely occur in the document and, therefore, present these probably-related words first in list 220 of alternate words. For example, the misspelled word, "fotune-telling", is probably "fortune-telling", because fortune-telling is a word related to divination, which is the topic of the document or is relevant to the content of the document. Latent semantic indexing is a method well known to those skilled in the art for determining the content of documents.

The order of list 220 of correctly spelled words corresponds to the likeliness that the word is related to the topic of the document. For example, if "rodent" occurs twenty times in the document and "computers" ten times, and the word "shrew" (a kind of rodent) is misspelled as "shriw", the replacement word "shrew" appears before "screw" in list 220 because "shrew" is more related to "rodents" than to computers. If a word appears in a header or title, or explicit list of keywords either in the document or entered by the user manually, these words are very likely to be relevant to a document's content. Latent semantic indexing can be used to assess relevance by known methods and, therefore, also used to order list 220 of alternate words so that most relevant words are at the top.

In step 330, spell checking process 300 also checks for "nearby" keys on the keyboard to improve the spell checker. This list of keys and their positions is stored in a file 91. For example, the file may contain records with the key names (e.g. "Q," "W," "E," etc.) and (x,y) positions of the key. The checking in step 330 involves a calculation of a distance function, or nearness, based on the distances of one key to another. For example, the V key on a typical U.S. keyboard is one key away from the C key. The distance of V to C may be denoted by $D_{v-c}$. The G key is further away from the C key than is the V key. The distance of G to C may be denoted by $D_{g-c}$. Note that $D_{g-c} > D_{v-c}$. Distance may be computed using known distance formulas from geometry. This distance information can be used to determine likely candidates to include in the list 220 of similarly spelled words. For example, the word "loce" is probably "love" because the "V" key is near (e.g. adjacent) to the "C" key. Step 320 considers these possible letter substitutions and presents a list of valid words with these likely substitutions. More likely candidates are listed before less likely candidates based on the distance D. A smaller distance is associated with a more likely substitute character than a larger distance. Note that such an approach would be useful in various kinds of keyboards, including Chinese language keyboards with over 100 keys.

Step 340 monitors a user's history of use with respect to letter substitutions and considers this information when presenting lists of alternative words in step 320. For example, if the user often types "v" instead of the nearby correct "c", this is considered when determining a likely list of correct words to replace the misspelled word. Information containing lists of past key substitutions may be stored in a database 94 (shown in FIG. 1) or in a remote computer, such as server 130. Each record in the database may contain a letter and its likely mistyped letter. Additionally, a user may supply information on likely key substitutions manually. For example, if a user knows that he often types "v" instead of "c," he may notify the system of this so that it may consider this information when presenting a list of correct words (step 320) to replace the misspelled word. Step 340 also monitors a user's history of use with respect to letter "swaps" and considers this information when presenting lists of alternative words in step 320. The term, letter "swaps", refers to the switching of two letters. For example, a user may frequently swap the letters "i" and "s" so that he types "si" when he means "is," or he may type "is" when he means "si." The system may automatically track these swaps or a user may manually notify the system that these swaps are likely to occur. Step 320 also monitors a user's history of. word corrections and maintains a list of likely substitutions, automatically derived from a user's past history of typing. For example, if "dive" is incorrectly spelled "duve," process 300 notes that both a u-to-i mistype and the "dive-to-duve" mistype occurred and uses this information in the future when step 320 presents a list of correct words to replace the misspelled word. In the "dive-to -duve" mistype example, a user's history of spell check corrections is monitored. In a sense, the system learns about the user's misspelling patterns by monitoring the number and nature of past selected corrections for words spell checked by a user. This information may be stored in a correction table 96 (shown in FIG. 1). Another example occurs if a user frequently misspells "behavior" as "behavoir," and makes this correction via the spell checker in past uses. Step 320 maintains table 96 with records such as "behavior—behavoir" to efficiently present lists 220 of alternative correctly-spelled words.

The various correction tables may reflect a user's personal preferences, history, and so forth, or they may be aggregate tables of corrections reflecting more than one user. The tables may be maintained, shared across networks, and provided by spell checkers.

The aforementioned methods of improving spell checking may be used alone or performed sequentially as a sequence of checks. Various priorities may be used so that one approach is given favor over another. For example, if a higher-priority method (e.g. the document content method in step 310) gives a list of three alternatives, and a lower-priority method (e.g. the key distances method in step 330) gives one alternative, the higher-priority alternatives are listed before the lower-priority alternatives. The priorities may be determined by manual input of a user or automatically provided by the system software.

Referring to FIGS. 2 and 3, step 350 may also provide an auxiliary window 230. Step 355 provides a user's most-frequently misspelled words for display in auxiliary window 230. Step 357 provides a user's most-recently misspelled words in auxiliary window 230. This information may be stored in a database for display in auxiliary window 230 when word-processing program 90 is invoked. The user can use mouse 46 to copy and paste words of interest from the auxiliary window 230 to current document 62 using the "clipboard" provided with many operating systems. In a windowing environment such as Microsoft Windows 95 or the Macintosh Finder, a temporary storage area in memory ("the clipboard memory") exists to which material is cut or copied from a document. The material is stored until the user pastes the material somewhere else. For example, spell checking process 300 determines that a user often misspells the words, behavior and dive. These words are listed in auxiliary window 230. The user may copy and paste, or drag and drop, the words as needed. Seeing the correct words on the screen may also have educative value, reinforcing in the user's mind the correct spelling for each word. The problem area of the word, for example, the letters that are most often incorrectly substituted, may be highlighted 235. This may also have educative value. Highlighting 235 is accomplished by step 360. If desired, highlighting 235 may also be done in the main window, in which the word resides. For example, a letter in a word may change a color 236 to indicate that it is wrong.

Figure 4:
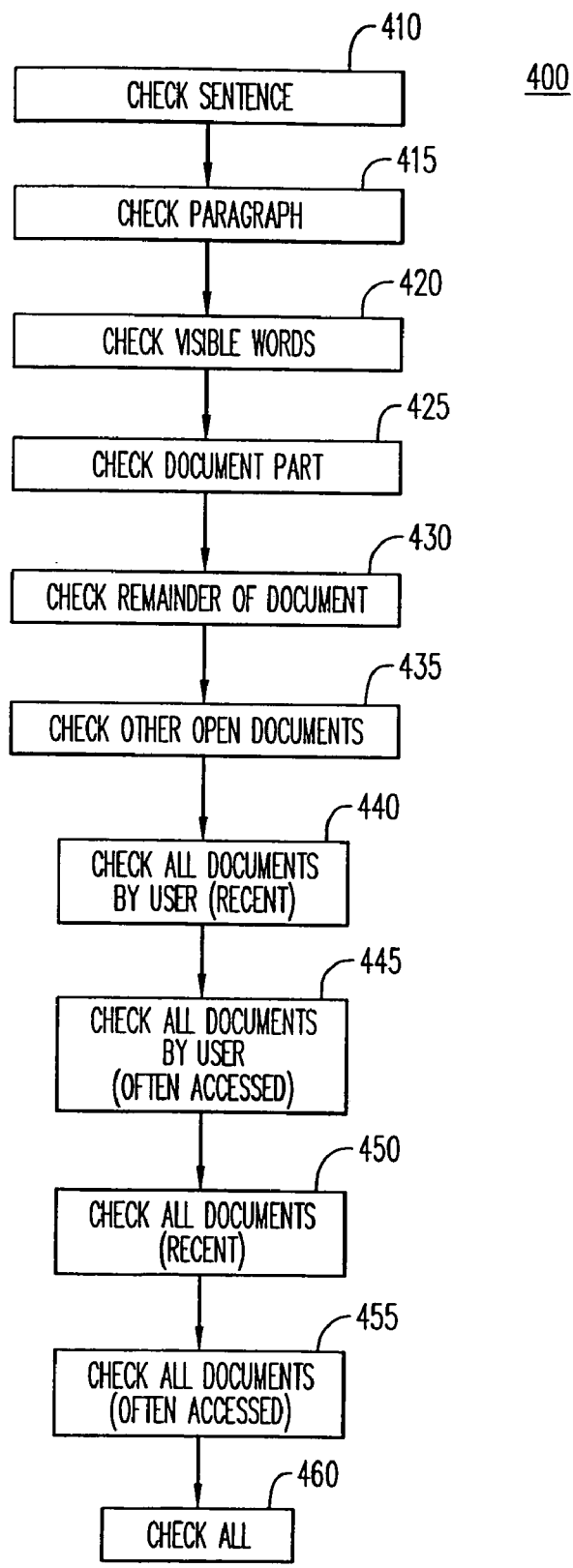
FIG. 4 is a flow chart illustrating how the steps 310, 330, and 340 may be prioritized spatially.

FIG. 4 is a flow chart illustrating a prioritizing process 400 by which spell checker 93 may prioritize information gathering in spell checking process 300. When checking for content (step 310) and a user's history (step 330), spell checker 93 may prioritize so as to give "spatial" preference to information related to words visible on the screen, then words in the current document part (e.g. chapter), then words in the document, then words in other opened documents, then words for all documents the user has edited. In this way, information highly relevant to a user's need may be gathered. In particular, step 410 determines the content and letter substitutions for the text of the same sentence that contains the misspelled word. Step 415 determines the content and letter substitutions for the text of the same paragraph that contains the misspelled word. Step 420 determines the content and letter substitutions for the text that is visible on the screen. Step 425 determines the content and letter substitutions for the text of the same document part that contains the misspelled word. Document part may refer to text between major headings, such as text in a chapter in which the misspelled word resides. Step 430 determines the content and letter substitutions for the remainder of the document. Step 435 determines the content and letter substitutions for all open documents. Step 440 determines the content and letter substitutions for all documents recently accessed by the user. For example, the term recent may refer to documents open during the previous N hours. The value of N may be set by the user. Step 445 determines the content and letter substitutions for the most often accessed documents by a user. For example, the term "most often" may refer to documents accessed greater than M times. The value of M may be set by the user. Step 450 determines the content and letter substitutions for all documents recently accessed by all users. For example, spell checker 93 may have access to documents created by other users over the Internet or stored in some accessible repository of documents. Step 455 determines the content and letter substitutions for the most often accessed documents by various users. Step 460 determines the content and letter substitutions for all available documents. This information may be stored in databases. This additional information may used in many ways. For example, if the document content is "floods" for the visible text on screen (as checked in step 420) and the entire document content is "Bible" (as checked in step 430), related words presented in list 220 are ordered so that correctly-spelled words relating to floods may appear before the words relating to Bible.

Note that although examples have been given with respect to keyboard input, the methods presented here may apply to systems with speech input and handwriting recognition. Therefore, the system and method can also be used to improve handwriting and speech recognition. For example, a user speaks the word, "proof", into microphone 51. A speech recognition system 98 may not be sure which of several words such as "proof," "prude," or "prune" the user spoke. However, by detecting the content of the document being composed (step 310) or monitoring a user's history (step 340), the user may be presented a more relevant list and ordering of alternative words to choose from.

This smart spell checker 93 may reside on a local or remote computer, a personal digital assistant, a kiosk, a set-top box, a TV, a camera, or other device. This spell checker is useful in any word processing situation, in which a user enters text, for example, when filling out on-line forms and in typing URLs or search terms in web browsers.

The present invention having been thus described with particular reference to the preferred forms thereof, it will be obvious that various changes and modifications may be made therein without departing from the spirit and scope of the present invention as defined in the appended claims.

What is claimed is:

1. A method of spell checking a document being processed by a word processing program, said method comprising:
   (a) reporting a misspelled word to a user;
   (b) determining a first group of one or more words that each include a substitute letter for a letter contained in the misspelled word, wherein a keyboard key of the substitute letter is a nearby keyboard key of the letter contained in said misspelled word; and
   (c) presenting to the user a list of replacement words that have spellings similar to said misspelled word, said list including one or more words selected from said first group of words.

2. The method of claim 1, wherein step (b) determines which words to include in said first group of words based on distance between the keyboard keys of the respective substitute letters and the respective keyboard keys of the letters contained in the misspelled word.

3. The method of claim 2, wherein the order of a first one and a second one of said selected words in said replacement list is determined by the distance of said first and second selected words that is smaller.

4. The method of claim 2, wherein said selected words are chosen based on a history the user's past letter substitutions.

5. The method of claim 4, wherein said history includes the user's letter swaps, and wherein the replacement list includes alternative words based on said history of letter swaps.

6. The method of claim 5, further comprising:
   (d) monitoring the user's mistypes that include letter swaps and incorporating said mistypes to said history, and wherein said history includes words that contain letter substitutions or letter swaps that are supplied by the user.

7. The method of claim 1, further comprising presenting to the user another list of the user's misspelled words.

8. The method of claim 7, wherein said other list includes words that the user either most frequently misspells or has most recently misspelled.

9. The method of claim 1, further comprising:
   determining from a content of said document a second group of one or more words that includes words actually occurring in said document,
   wherein said list includes one or more words selected from either or both of said first and second groups of words.

10. The method of claim 9, wherein said list of replacement words is ordered with said selected words of the first group appearing before any selected words of the second group.

11. A computer readable medium that includes computer executable instructions for performing steps, comprising:
   (a) reporting a misspelled word to a user;
   (b) determining a first group of one or more words that each include a substitute letter for a letter contained in the misspelled word, wherein a keyboard key of the substitute letter is a nearby keyboard key of the letter contained in said misspelled word; and
   (c) presenting to the user a list of replacement words that have spellings similar to said misspelled word, said list including one or more words selected from said first group of words.

12. The computer readable medium of claim 11, wherein step (b) determines which words to include in said first group of words based on distance between the keyboard keys of the respective substitute letters and the respective keyboard keys of the letters contained in the misspelled word.

13. The computer readable medium of claim 12, wherein the order of a first one and a second one of said selected words in said replacement list is determined by the distance of said first and second selected words that is smaller.

14. The computer readable medium of claim 12, wherein said selected words are chosen based on a history the user's past letter substitutions.

15. The computer readable medium of claim 14, wherein said history includes the user's letter swaps, and wherein the replacement list includes alternative words based on said history of letter swaps.

16. The computer readable medium of claim 15 including further executable instructions for performing the step of (d) monitoring the user's mistypes that include letter swaps and incorporating said mistypes to said history, and wherein said history includes words that contain letter substitutions or letter swaps that are supplied by the user.

17. The computer readable medium of claim 11, further comprising presenting to the user another list of the user's misspelled words.

18. The computer readable medium of claim 17, wherein said other list includes words that the user either most frequently misspells or has most recently misspelled.

19. The computer readable medium of claim 11, further comprising
   determining from a content of said document a second group of one or more words that includes words actually occurring in said document,
   wherein said list includes one or more words selected from either or both of said first and second groups of words.

20. The computer readable medium of claim 19, wherein said list of replacement words is ordered with said selected words of the first group appearing before any selected words of the second group.

* * * * *